(12) United States Patent
Brown et al.

(10) Patent No.: US 8,538,560 B2
(45) Date of Patent: Sep. 17, 2013

(54) WIRELESS POWER AND COMMUNICATION UNIT FOR PROCESS FIELD DEVICES

(75) Inventors: Gregory Brown, Chanhassen, MN (US); George Hausler, Maple Grove, MN (US); Philip Ostby, Cologne, MN (US); Robert Karschnia, Chaska, MN (US); Richard Nelson, Chanhassen, MN (US); Mark Fandrey, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 1651 days.

(21) Appl. No.: 10/850,828

(22) Filed: May 21, 2004

(65) Prior Publication Data

US 2005/0245291 A1    Nov. 3, 2005

Related U.S. Application Data

(63) Continuation-in-part of application No. 29/204,502, filed on Apr. 29, 2005, now Pat. No. Des. 528,020.

(51) Int. Cl.
| | |
|---|---|
| G05B 11/01 | (2006.01) |
| G05B 15/00 | (2006.01) |
| H04B 17/00 | (2006.01) |
| H04B 1/16 | (2006.01) |
| H04B 1/38 | (2006.01) |
| G06F 1/26 | (2006.01) |

(52) U.S. Cl.
USPC .............. 700/22; 700/19; 700/83; 455/67.11; 455/343.1; 455/574; 713/320

(58) Field of Classification Search
CPC ............................................. G05B 2219/31472
USPC .................. 700/19, 17, 83, 20, 22; 713/320, 713/330; 455/76.11, 343.1, 574, 67.11
See application file for complete search history.

(56) References Cited

U.S. PATENT DOCUMENTS

| | | | | |
|---|---|---|---|---|
| 2,640,667 A | 6/1953 | Winn | ............................... | 248/65 |
| 2,883,489 A | 4/1959 | Eadie, Jr. et al. | ............. | 335/148 |

(Continued)

FOREIGN PATENT DOCUMENTS

| | | |
|---|---|---|
| CH | 672 368 A5 | 11/1989 |
| CN | 06 199284 A | 7/1994 |

(Continued)

OTHER PUBLICATIONS

USA & Metric Thread Standards http://www.carrlane.com/Catalog/index.cfm/29425071F0B221118070C1C513906103E0B05543B0B012009083C3B285357474A2D020609090C0015312A36515F554A5B.*

(Continued)

*Primary Examiner* — Kavita Padmanabhan
*Assistant Examiner* — Darrin Dunn
(74) *Attorney, Agent, or Firm* — Westman, Champlin & Kelly, P.A.

(57) ABSTRACT

A wireless power and communication unit for field devices is configured to connect to a field device and provide operating power and wired digital communication between the unit and the field device. RF circuitry in the unit is configured for radio frequency communication. In one embodiment, power supply circuitry in the unit includes one or more solar power cells that convert solar energy into electricity to power both the unit and the field device. The unit interacts with the field device in accordance with a standard industry communication protocol. The unit communicates wirelessly with an external device, such as a control room, based upon the interaction with the field device.

31 Claims, 9 Drawing Sheets

(56) References Cited

U.S. PATENT DOCUMENTS

| | | | |
|---|---|---|---|
| 3,229,759 A | 1/1966 | Grover et al. ............... 165/105 |
| 3,232,712 A | 2/1966 | Stearns ........................ 23/255 |
| 3,568,762 A | 3/1971 | Harbaugh .................... 165/105 |
| 3,612,851 A | 10/1971 | Fowler ........................ 362/30 |
| 3,631,264 A | 12/1971 | Morgan ....................... 327/309 |
| 3,633,053 A | 1/1972 | Peters |
| D225,743 S | 1/1973 | Seltzer ........................ D10/102 |
| 3,881,962 A | 5/1975 | Rubinstein .................. 136/209 |
| 3,885,432 A | 5/1975 | Herzl ........................ 73/861.22 |
| 3,931,532 A | 1/1976 | Byrd ............................. 310/4 |
| 4,005,319 A | 1/1977 | Nilsson et al. .............. 310/8.3 |
| 4,042,757 A | 8/1977 | Jones ........................ 429/104 |
| 4,063,349 A | 12/1977 | Passler et al. ............... 29/627 |
| 4,084,155 A | 4/1978 | Herzl et al. ............ 340/870.39 |
| 4,116,060 A | 9/1978 | Frederick .................. 73/861.22 |
| 4,125,122 A | 11/1978 | Stachurski .................. 136/205 |
| 4,322,724 A | 3/1982 | Grudzinski .................. 340/595 |
| 4,361,045 A | 11/1982 | Iwasaki ........................ 73/654 |
| 4,370,890 A | 2/1983 | Frick ............................ 73/718 |
| 4,383,801 A | 5/1983 | Pryor ............................ 416/17 |
| 4,389,895 A | 6/1983 | Rud, Jr. ........................ 73/724 |
| 4,390,321 A | 6/1983 | Langlois et al. ............... 417/15 |
| 4,475,047 A | 10/1984 | Ebert, Jr. ...................... 307/66 |
| 4,476,853 A * | 10/1984 | Arbogast .................... 126/578 |
| 4,485,670 A | 12/1984 | Camarda et al. .............. 73/179 |
| 4,510,400 A | 4/1985 | Kiteley ........................ 307/66 |
| 4,570,217 A | 2/1986 | Allen et al. .................. 700/19 |
| 4,590,466 A | 5/1986 | Wiklund et al. ......... 340/870.28 |
| 4,637,020 A | 1/1987 | Schinabeck .................. 714/736 |
| 4,639,542 A | 1/1987 | Bass et al. .................... 136/210 |
| 4,704,607 A | 11/1987 | Teather et al. ............ 340/825.07 |
| 4,749,993 A | 6/1988 | Szabo et al. ............. 340/870.31 |
| 4,860,232 A | 8/1989 | Lee et al. ................ 364/571.04 |
| 4,878,012 A | 10/1989 | Schulte et al. ............... 324/60 |
| 4,977,480 A | 12/1990 | Nishihara .................... 73/724 |
| 4,982,412 A | 1/1991 | Gross ............................ 377/6 |
| 5,009,311 A | 4/1991 | Schenk ........................ 206/332 |
| 5,014,176 A | 5/1991 | Kelleher et al. ................ 363/26 |
| 5,023,746 A | 6/1991 | Epstein ........................ 361/56 |
| 5,025,202 A | 6/1991 | Ishii et al. .................... 320/101 |
| 5,079,562 A | 1/1992 | Yarsunas et al. .............. 343/792 |
| 5,094,109 A | 3/1992 | Dean et al. .................... 73/718 |
| D331,370 S | 12/1992 | Williams ...................... D10/46 |
| 5,170,671 A | 12/1992 | Miau et al. ................ 73/861.22 |
| 5,223,763 A | 6/1993 | Chang ........................ 310/339 |
| D345,107 S | 3/1994 | Williams ...................... D10/46 |
| 5,313,831 A | 5/1994 | Beckman .................. 73/204.24 |
| 5,329,818 A | 7/1994 | Frick et al. .................... 73/708 |
| 5,412,535 A | 5/1995 | Chao et al. .................. 361/700 |
| 5,495,769 A | 3/1996 | Broden et al. ................. 73/18 |
| 5,506,757 A | 4/1996 | Brorby ........................ 361/796 |
| 5,531,936 A | 7/1996 | Kanatzidis et al. ........... 252/587 |
| 5,554,809 A | 9/1996 | Tobita et al. .................. 73/700 |
| 5,554,922 A | 9/1996 | Kunkel ........................ 322/3 |
| 5,606,513 A | 2/1997 | Louwagie et al. ............. 702/138 |
| 5,614,128 A | 3/1997 | Kanatzidis et al. ........... 252/582 |
| 5,618,471 A | 4/1997 | Kanatzidis et al. ........... 252/582 |
| 5,637,802 A | 6/1997 | Frick et al. .................... 73/724 |
| 5,642,301 A | 6/1997 | Warrior et al. ............ 364/571.02 |
| 5,644,185 A | 7/1997 | Miller ........................ 310/306 |
| 5,656,782 A | 8/1997 | Powell, II et al. .............. 73/756 |
| 5,665,899 A | 9/1997 | Willcox ........................ 731/1.63 |
| 5,682,476 A | 10/1997 | Tapperson et al. ............ 370/225 |
| 5,705,978 A | 1/1998 | Frick et al. .................. 340/511 |
| 5,722,249 A | 3/1998 | Miller, Jr. .................... 62/238.2 |
| 5,726,846 A | 3/1998 | Houbre ........................ 361/93 |
| 5,764,891 A * | 6/1998 | Warrior ........................ 710/72 |
| 5,793,963 A | 8/1998 | Tapperson et al. ....... 395/200.31 |
| 5,803,604 A | 9/1998 | Pompei ...................... 374/181 |
| 5,811,201 A | 9/1998 | Skowronski .................. 429/17 |
| 5,851,083 A | 12/1998 | Palan ........................ 403/337 |
| 5,870,695 A | 2/1999 | Brown et al. ................ 702/138 |
| 5,872,494 A | 2/1999 | Palan et al. .................. 333/252 |
| 5,899,962 A | 5/1999 | Louwagie et al. ............. 702/138 |
| 5,929,372 A | 7/1999 | Oudoire et al. .............. 136/208 |
| 5,954,526 A | 9/1999 | Smith ........................ 439/136 |
| 5,957,727 A | 9/1999 | Page, Jr. .................. 439/607.58 |
| 5,978,658 A | 11/1999 | Shoji ............................ 455/66 |
| 6,013,204 A | 1/2000 | Kanatzidis et al. ........... 252/584 |
| 6,079,276 A | 6/2000 | Frick et al. .................... 73/18 |
| 6,104,759 A | 8/2000 | Carkner et al. .............. 375/295 |
| 6,109,979 A | 8/2000 | Garnett ...................... 439/709 |
| 6,126,327 A | 10/2000 | Bi et al. ...................... 709/221 |
| 6,127,739 A | 10/2000 | Appa ............................ 290/55 |
| 6,150,798 A | 11/2000 | Ferry et al. .................. 323/273 |
| 6,255,010 B1 | 7/2001 | George et al. ................ 429/30 |
| 6,282,247 B1 | 8/2001 | Shen ........................ 375/285 |
| 6,295,875 B1 | 10/2001 | Frick et al. .................... 73/718 |
| 6,312,617 B1 | 11/2001 | Kanatzidis et al. ........... 252/62.3 |
| 6,326,764 B1 | 12/2001 | Virtudes .................... 320/101 |
| 6,338,283 B1 | 1/2002 | Blazquez Navarro et al. ............................ 73/865.8 |
| 6,360,277 B1 * | 3/2002 | Ruckley et al. ............. 709/250 |
| 6,385,972 B1 | 5/2002 | Fellows ........................ 60/517 |
| 6,405,139 B1 * | 6/2002 | Kicinski et al. ................ 702/33 |
| 6,441,747 B1 | 8/2002 | Khair et al. ............. 340/870.16 |
| 6,457,367 B1 | 10/2002 | Behm et al. .................... 73/753 |
| 6,480,699 B1 | 11/2002 | Lovoi ........................ 455/41.2 |
| 6,508,131 B2 | 1/2003 | Frick ............................ 73/756 |
| 6,574,515 B1 | 6/2003 | Kirkpatrick et al. ............ 700/19 |
| 6,640,308 B1 | 10/2003 | Keyghobad et al. .......... 713/300 |
| 6,661,220 B1 | 12/2003 | Glehr ...................... 324/207.17 |
| 6,667,594 B2 | 12/2003 | Chian ........................ 318/696 |
| 6,690,182 B2 | 2/2004 | Kelly et al. ................... 324/700 |
| 6,711,446 B2 * | 3/2004 | Kirkpatrick et al. ............ 700/19 |
| 6,747,573 B1 | 6/2004 | Gerlach et al. ........... 340/870.21 |
| 6,774,814 B2 | 8/2004 | Hilleary .................. 340/870.07 |
| 6,778,100 B2 * | 8/2004 | Schempf .................. 340/870.07 |
| 6,792,259 B1 | 9/2004 | Parise ........................ 455/343.1 |
| 6,794,067 B1 | 9/2004 | Acker et al. ................ 429/408 |
| 6,823,072 B1 | 11/2004 | Hoover ........................ 381/7 |
| 6,838,859 B2 | 1/2005 | Shah ............................ 322/38 |
| 6,839,546 B2 | 1/2005 | Hedtke ...................... 455/67.11 |
| 6,839,790 B2 | 1/2005 | Barros De Almeida et al. ............................ 710/305 |
| 6,843,110 B2 | 1/2005 | Deane et al. ............... 73/114.35 |
| 6,891,477 B2 | 5/2005 | Aronstam .................... 340/606 |
| 6,891,838 B1 | 5/2005 | Petite et al. .................... 370/401 |
| 6,904,295 B2 | 6/2005 | Yang ............................ 455/522 |
| 6,907,383 B2 | 6/2005 | Eryurek et al. ............... 702/183 |
| 6,910,332 B2 | 6/2005 | Fellows ........................ 60/520 |
| 6,942,728 B2 | 9/2005 | Caillat et al. .................... 117/3 |
| 6,984,899 B1 | 1/2006 | Rice ............................ 290/44 |
| 6,995,677 B2 | 2/2006 | Aronstam et al. ............. 340/606 |
| 6,995,685 B2 | 2/2006 | Randall .................... 340/870.39 |
| 7,010,294 B1 * | 3/2006 | Pyotsia et al. ................ 455/420 |
| 7,036,983 B2 | 5/2006 | Green et al. .................... 374/179 |
| 7,043,250 B1 | 5/2006 | DeMartino .................. 455/445 |
| 7,058,542 B2 | 6/2006 | Hauhia et al. ................ 702/183 |
| 7,073,394 B2 | 7/2006 | Foster ...................... 73/861.22 |
| 7,116,036 B2 | 10/2006 | Balasubramaniam et al. ............................ 310/322 |
| 7,136,725 B1 | 11/2006 | Paciorek et al. .............. 700/295 |
| 7,173,343 B2 | 2/2007 | Kugel ........................ 290/1 R |
| 7,197,953 B2 | 4/2007 | Olin ........................ 73/866.5 |
| 7,233,745 B2 | 6/2007 | Loechner .................... 398/128 |
| 7,262,693 B2 | 8/2007 | Karchnia et al. .............. 340/508 |
| 7,271,679 B2 | 9/2007 | Lundberg et al. .............. 333/24 |
| 7,301,454 B2 | 11/2007 | Seyfang et al. .......... 340/539.26 |
| 7,319,191 B2 | 1/2008 | Poon et al. .................. 174/50.62 |
| 7,329,959 B2 | 2/2008 | Kim et al. .................... 290/2 |
| 7,351,098 B2 | 4/2008 | Gladd et al. .................. 439/578 |
| 7,539,593 B2 | 5/2009 | Machacek .................... 702/127 |
| 7,560,907 B2 | 7/2009 | Nelson ........................ 322/37 |
| 7,626,141 B2 | 12/2009 | Rodriguez-Medina et al. ............................ 219/260 |
| 7,726,017 B2 | 6/2010 | Evans et al. .................... 29/854 |
| 7,983,049 B2 | 7/2011 | Leifer et al. .................. 361/728 |
| 8,005,514 B2 | 8/2011 | Saito et al. .................. 455/572 |
| 8,150,462 B2 | 4/2012 | Guenter et al. .............. 455/557 |
| 2001/0025349 A1 | 9/2001 | Sharood et al. .............. 713/340 |
| 2002/0029130 A1 | 3/2002 | Eryurek et al. .............. 702/183 |
| 2002/0065631 A1 | 5/2002 | Loechner .................... 702/188 |
| 2002/0095520 A1 | 7/2002 | Wettstein et al. .............. 709/253 |

| | | | |
|---|---|---|---|
| 2002/0097031 A1 | 7/2002 | Cook et al. | 323/273 |
| 2002/0105968 A1 | 8/2002 | Pruzan et al. | 370/465 |
| 2002/0148236 A1 | 10/2002 | Bell | 62/3.3 |
| 2002/0163323 A1 | 11/2002 | Kasai et al. | 323/284 |
| 2003/0030537 A1* | 2/2003 | Kogure | 340/3.5 |
| 2003/0032993 A1 | 2/2003 | Mickle et al. | 600/509 |
| 2003/0042740 A1 | 3/2003 | Holder et al. | 290/1 A |
| 2003/0043052 A1* | 3/2003 | Tapperson et al. | 340/825.37 |
| 2003/0079553 A1 | 5/2003 | Cain et al. | 73/861.27 |
| 2003/0097521 A1* | 5/2003 | Pfandler et al. | 711/103 |
| 2003/0134161 A1 | 7/2003 | Gore et al. | 429/12 |
| 2003/0143958 A1 | 7/2003 | Elias et al. | 455/73 |
| 2003/0167631 A1 | 9/2003 | Hallenbeck | 29/835 |
| 2003/0171827 A1* | 9/2003 | Keyes et al. | 700/19 |
| 2003/0199778 A1 | 10/2003 | Mickle et al. | 600/509 |
| 2003/0204371 A1 | 10/2003 | Sciamanna | 702/183 |
| 2004/0070599 A1* | 4/2004 | Mori et al. | 345/735 |
| 2004/0081872 A1 | 4/2004 | Herman et al. | 429/26 |
| 2004/0085240 A1 | 5/2004 | Faust | 342/124 |
| 2004/0086021 A1 | 5/2004 | Litwin | 374/120 |
| 2004/0142733 A1 | 7/2004 | Parise | 455/572 |
| 2004/0159235 A1 | 8/2004 | Marganski et al. | 95/116 |
| 2004/0199681 A1 | 10/2004 | Hedtke | 710/37 |
| 2004/0200519 A1 | 10/2004 | Sterzel et al. | 136/238 |
| 2004/0203434 A1* | 10/2004 | Karschnia et al. | 455/67.11 |
| 2004/0211456 A1 | 10/2004 | Brown et al. | 136/243 |
| 2004/0214543 A1 | 10/2004 | Osone et al. | 455/197.2 |
| 2004/0242169 A1 | 12/2004 | Albsmeier et al. | 455/91 |
| 2004/0249483 A1 | 12/2004 | Wojsznis et al. | 700/52 |
| 2004/0259533 A1 | 12/2004 | Nixon et al. | 455/414.1 |
| 2005/0011278 A1 | 1/2005 | Brown et al. | 73/861.18 |
| 2005/0017602 A1 | 1/2005 | Arms et al. | 310/339 |
| 2005/0023858 A1 | 2/2005 | Bingle et al. | 296/76 |
| 2005/0029236 A1 | 2/2005 | Gambino et al. | 219/121.69 |
| 2005/0046595 A1* | 3/2005 | Blyth | 340/908 |
| 2005/0072239 A1 | 4/2005 | Longsdorf et al. | 73/649 |
| 2005/0074324 A1 | 4/2005 | Yoo | 415/4.3 |
| 2005/0076944 A1 | 4/2005 | Kanatzidis et al. | 136/239 |
| 2005/0082949 A1 | 4/2005 | Tsujiura | 310/339 |
| 2005/0099010 A1 | 5/2005 | Hirsch | 290/42 |
| 2005/0106927 A1 | 5/2005 | Goto et al. | 439/404 |
| 2005/0115601 A1 | 6/2005 | Olsen et al. | 136/212 |
| 2005/0118468 A1 | 6/2005 | Adams et al. | 429/22 |
| 2005/0122653 A1 | 6/2005 | McCluskey et al. | 361/92 |
| 2005/0130605 A1 | 6/2005 | Karschnia et al. | 455/90.3 |
| 2005/0132808 A1 | 6/2005 | Brown et al. | 73/592 |
| 2005/0134148 A1 | 6/2005 | Buhler et al. | 310/339 |
| 2005/0139250 A1 | 6/2005 | DeSteese et al. | 136/212 |
| 2005/0146220 A1 | 7/2005 | Hamel et al. | 307/44 |
| 2005/0153593 A1 | 7/2005 | Takayanagi et al. | 439/352 |
| 2005/0164684 A1 | 7/2005 | Chen et al. | 455/414.1 |
| 2005/0182501 A1* | 8/2005 | Franchuk et al. | 700/81 |
| 2005/0197803 A1 | 9/2005 | Eryurek et al. | 702/185 |
| 2005/0201349 A1 | 9/2005 | Budampati | 370/342 |
| 2005/0208908 A1 | 9/2005 | Karschnia et al. | 455/127.1 |
| 2005/0222698 A1* | 10/2005 | Eryurek et al. | 700/90 |
| 2005/0235758 A1 | 10/2005 | Kowal et al. | 73/891.29 |
| 2005/0242979 A1 | 11/2005 | Hamilton et al. | 341/144 |
| 2005/0245291 A1 | 11/2005 | Brown et al. | 455/572 |
| 2005/0273205 A1 | 12/2005 | Nickerson et al. | 700/284 |
| 2005/0276233 A1 | 12/2005 | Shepard et al. | 370/254 |
| 2005/0281215 A1 | 12/2005 | Budampati et al. | 370/328 |
| 2005/0289276 A1 | 12/2005 | Karschnia et al. | 710/305 |
| 2006/0002368 A1 | 1/2006 | Budampati et al. | 370/351 |
| 2006/0036404 A1 | 2/2006 | Wiklund et al. | 702/183 |
| 2006/0058847 A1 | 3/2006 | Lenz et al. | 607/5 |
| 2006/0060236 A1 | 3/2006 | Kim et al. | 136/236 |
| 2006/0063522 A1 | 3/2006 | McFarland | 455/423 |
| 2006/0077917 A1 | 4/2006 | Brahmajosyula et al. | 370/310 |
| 2006/0092039 A1 | 5/2006 | Saito et al. | 340/825.37 |
| 2006/0128689 A1 | 6/2006 | Gomtsyan et al. | 514/217.01 |
| 2006/0142875 A1 | 6/2006 | Keyes, IV et al. | 700/1 |
| 2006/0148410 A1 | 7/2006 | Nelson et al. | 455/67.11 |
| 2006/0181406 A1 | 8/2006 | Petite et al. | 340/521 |
| 2006/0227729 A1 | 10/2006 | Budampati et al. | 370/278 |
| 2006/0274644 A1 | 12/2006 | Budampati et al. | 370/216 |
| 2006/0274671 A1 | 12/2006 | Budampati et al. | 370/254 |
| 2006/0278023 A1 | 12/2006 | Garneyer et al. | 73/862.333 |
| 2006/0287001 A1 | 12/2006 | Budampati et al. | 455/552.1 |
| 2007/0006528 A1 | 1/2007 | Diebold et al. | 48/197 R |
| 2007/0030816 A1 | 2/2007 | Kolavennu | 370/252 |
| 2007/0030832 A1 | 2/2007 | Gonia et al. | 370/338 |
| 2007/0039371 A1 | 2/2007 | Omata et al. | 73/9 |
| 2007/0054630 A1 | 3/2007 | Scheible et al. | 455/90.3 |
| 2007/0055463 A1* | 3/2007 | Florenz et al. | 702/50 |
| 2007/0135867 A1 | 6/2007 | Klosterman et al. | 607/60 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0273496 A1 | 11/2007 | Hedtke | 340/506 |
| 2007/0275755 A1 | 11/2007 | Chae et al. | 455/557 |
| 2007/0279009 A1 | 12/2007 | Kobayashi | 320/166 |
| 2008/0010600 A1* | 1/2008 | Katano | 715/748 |
| 2008/0054645 A1 | 3/2008 | Kulkarni et al. | |
| 2008/0083446 A1 | 4/2008 | Chakraborty et al. | 136/205 |
| 2008/0088464 A1 | 4/2008 | Gutierrez | 340/606 |
| 2008/0114911 A1 | 5/2008 | Schumacher | 710/72 |
| 2008/0123581 A1 | 5/2008 | Wells et al. | |
| 2008/0141769 A1 | 6/2008 | Schmidt et al. | 73/204.19 |
| 2008/0268784 A1 | 10/2008 | Kantzes et al. | 455/66.1 |
| 2008/0273486 A1 | 11/2008 | Pratt et al. | 370/328 |
| 2009/0066587 A1 | 3/2009 | Hayes et al. | 343/702 |
| 2009/0120169 A1 | 5/2009 | Chandler et al. | 73/54.41 |
| 2009/0167613 A1 | 7/2009 | Hershey et al. | 343/702 |
| 2009/0195222 A1 | 8/2009 | Lu et al. | 322/3 |
| 2009/0200489 A1 | 8/2009 | Tappel et al. | 250/492.3 |
| 2009/0253388 A1 | 10/2009 | Kielb et al. | 455/117 |
| 2009/0260438 A1 | 10/2009 | Hedtke | 73/579 |
| 2009/0309558 A1 | 12/2009 | Kielb | 323/234 |
| 2009/0311975 A1 | 12/2009 | Vanderaa et al. | 455/90.3 |

FOREIGN PATENT DOCUMENTS

| | | |
|---|---|---|
| CN | 1251953 | 5/2000 |
| CN | 1429354 A | 7/2003 |
| CN | 1442822 A | 9/2003 |
| CN | 1969238 | 5/2007 |
| DE | 2710211 | 9/1978 |
| DE | 3340834 A1 | 5/1985 |
| DE | 201 07 112 U1 | 8/2001 |
| DE | 101 04 582 A1 | 10/2001 |
| EP | 0 524 550 A1 | 1/1993 |
| EP | 0729294 | 8/1996 |
| EP | 1 202 145 | 5/2002 |
| EP | 1 202 145 A1 | 5/2002 |
| EP | 1 293 853 | 3/2003 |
| EP | 1 482 568 A2 | 12/2004 |
| EP | 1879294 | 1/2008 |
| GB | 1 397 435 A | 6/1975 |
| GB | 2 145 876 A | 4/1985 |
| GB | 2 320 733 A | 7/1998 |
| JP | 59-075684 | 4/1984 |
| JP | 60-125181 | 7/1985 |
| JP | 02 067794 | 3/1990 |
| JP | 4-335796 | 11/1992 |
| JP | 8-125767 | 5/1996 |
| JP | 09-182308 | 7/1997 |
| JP | 11-036981 | 2/1999 |
| JP | 11-2158676 | 8/1999 |
| JP | 11-303726 | 11/1999 |
| JP | 2001-524226 | 11/2001 |
| JP | 2002369554 | 12/2002 |
| JP | 2003-051894 | 2/2003 |
| JP | 2003051894 | 2/2003 |
| JP | 2003134261 | 5/2003 |
| JP | 2003-195903 | 7/2003 |
| JP | 2004021877 | 1/2004 |
| JP | 2004-069197 | 3/2004 |
| JP | 2004208476 | 7/2004 |
| JP | 2004-317593 | 11/2004 |
| JP | 2005-72080 | 3/2005 |
| JP | 2005-122744 | 5/2005 |
| JP | 2005-207648 | 7/2005 |
| JP | 2006-180603 | 7/2006 |
| JP | 2007-200940 | 8/2007 |
| JP | 2008-17663 | 1/2008 |
| JP | 2008-504790 | 2/2008 |
| RU | 1813916 A1 | 7/1993 |
| RU | 2 131 934 C1 | 6/1999 |

| | | |
|---|---|---|
| RU | 2168062 | 5/2001 |
| RU | 2003128989 | 1/2007 |
| WO | WO 88/05964 | 8/1988 |
| WO | WO 91/11029 | 7/1991 |
| WO | WO 95/07522 | 3/1995 |
| WO | WO 99/53286 | 10/1999 |
| WO | WO 01/01742 | 1/2001 |
| WO | WO 01/51836 | 7/2001 |
| WO | WO 03/023536 | 3/2003 |
| WO | WO 03/089881 | 10/2003 |
| WO | WO 2004/038998 | 5/2004 |
| WO | WO 2004/059139 | 7/2004 |
| WO | WO 2004/082051 | 9/2004 |
| WO | WO 2004/094892 | 11/2004 |
| WO | WO 2005/086331 | 9/2005 |
| WO | WO 2006/109362 | 10/2006 |
| WO | WO 2007/031435 | 3/2007 |
| WO | WO 2007/037988 | 4/2007 |
| WO | WO 2005/060482 | 7/2007 |
| WO | WO 2008/098583 | 8/2008 |

OTHER PUBLICATIONS

Foundation Fieldbus Power Supply, A Look at Powering Fieldbus, www.analogservices.com/fbsupp2.pdf, Oct. 22, 2000.*
The International Search Report and Written Opinion in Appln No. PCT/US2005/021757, filed Jun. 21, 2005.
The International Search Report and Written Opinion in Application No. PCT/US2006/035729, filed Sep. 13, 2006.
Notification of Transmittal of the International Search Report or the Declaration—PCT/US03/10403.
"Wireless R&D Aims to Boost Traffic", by M. Moore, *InTech with Industrial Computing*, Feb. 2002, 3 pgs.
"System Checks Faraway Machines' Health", by J. Strothman, *InTech with Industrial Computing*, Feb. 2002, 1 pg.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. II, III, IV and 1-12, Dec. 2003.
"Wireless Dual Analog Input Interface Transmitter Installation and User's Manual", by Honeywell International Inc., Phoenix, Arizona, pp. II-VI and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com , Apr. 2004.
4 Pages from Website http://content.honeywell.com/imc/eznews/eznews0403/news.htm, 2004.
Examination Report of the European Patent Office in Application No. 05724190.3, filed Mar. 2, 2005.
International Search Report and Written Opinion of Application No. PCT/US2005/015848, file May 5, 2005.
The Offical Communication in Application No. 05746241.8, filed May 5, 2005.
The Official Communication in Application No. 2006145434, filed May 5, 2005.
Second Official Action from Russian Patent Application No. 2006145434, filed May 5, 2005.
Office Action from U.S. Appl. No. 11/028,486, filed Jan. 3, 2005.
First Office Action from Chinese Patent Application No. 2005800142124, filed May 5, 2005.
First Office Action from Chinese Patent Application No. 200580006438.X, filed Mar. 2, 2005.
Examiner's consultation for European Patent Application 05 724 190.3, filed Mar. 2, 2005.
Second Office Action from Chinese Patent Application No. 200580014212.4, filed March May 5, 2005.
Third Office Action from Chinese patent application No. 200580014212.4, dated Dec. 19, 2008.
Notification of Transmittal of the International Search Report and the Written Opinion, PCT/US2007/019636, dated Oct. 1, 2008.
Invitation to Pay Additional Fees and Partial Search Report, PCT/US2007/019396, dated Oct. 7, 2008.
Notification on Results of Examining the Invention for Patentability from Russian patent application No. 2006145434, filed May 5, 2005.
Official Action from Russian patent application 2008116682, dated Jan. 16, 2009.
First Office Action for Chinese patent application 200680015575.4, filed Jun. 27, 2006.
Second Office Action from Chinese patent application 200580006438.X, dated Apr. 10, 2009.
First examination report for Indian patent application No. 3589/CHENP/2006, dated Apr. 17, 2009.
Decision on refusal to grant a patent for invention for Russian patent application No. 2006145434, filed May 5, 2005.
First Rejection Notice issued for Japanese patent application No. 2007-527282, dated Dec. 14, 2009.
Fourth Office Action for Chinese patent application No. 200580014212.4, dated Jul. 24, 2009.
Official Letter for Mexican patent application No. PA/A/2006/013488, dated Jun. 25, 2009.
English machine translation of JP2004208476 A.
"Every Little Helps," Economist, vol. 278, No. 8469, p. 78, Mar. 18, 2006.
"Thermal Design and Heat Sink Manufacturing & Testing—Total Thermal and Heat Sink . . . ," http://www.enertron-inc.com/enertron-products/integrated-heat-sink.php, Mar. 31, 2006.
Zahnd et al., "Piezoelectric Windmill: A Novel Solution to Remote Sensing," Japanese Journal of Applied Physics, V. 44, No. 3, p. L104-L105, 2005.
"Heat Pipe—Wikipedia, the free encyclopedia," http://en.wikipedia.org/wiki/Heat_pipe, Mar. 31, 2006.
"High Power Single PSE Controller With Internal Switch," Linear Technology LTC4263-1, p. 1-20.
Office Action from European patent application No. 07837769.4, dated Jul. 14, 2009.
First Office Action from Australian patent application No. 2005248759, dated Apr. 30, 2009.
Second Office Action from Australian patent application No. 2005248759, dated Aug. 28, 2009.
Search Report and Written Opinion for international patent application No. PCT/US2009/002476, dated Apr. 21, 2009.
Third Office Action from Chinese patent application No. 200580006438.X, dated Sep. 28, 2009.
Second Official Action from Russian patent application No. 2008116682, dated Apr. 13, 2009.
First Official Action from Russian patent application No. 2006134646, dated Mar. 12, 2008.
First Official Action from Russian patent application No. 2008103014, dated Jun. 9, 2009.
First Communication from European patent application No. 06803540.1, dated Jun. 30, 2008.
Fifth Office Action from Chinese patent application No. 200580014212.4, dated Nov. 13, 2009.
Second Office Action for Chinese patent application No. 200680015575.4, dated Sep. 25, 2009.
Third Official Action for Russian patent application No. 2008116682, dated Sep. 11, 2009.
Notification of Transmittal of the International Search Report and the Written Opinion for International application No. PCT/US2009/062152.
First Office Action for Chinese application No. 200780018710.5 dated May 12, 2010.
Rejection Notice for Japanese patent application No. 2007527282, dated Jul. 28, 2010.
Summons to attend oral proceedings for the European application No. 05746241.8 dated May 26, 2010.
The sixth Office Action from Chinese application No. 2005800014212.4, dated Aug. 17, 2010.

Conclusion and Notification on rehearing for Russian patent application No. 2006145434/09 issued on Sep. 17, 2010.
The seventh Office Action from Chinese patent application No. 200580014212.4 issued on Jan. 31, 2011.
First Office Action from Japanese patent application No. 2008-532280 dated Mar. 1, 2011.
Second Office Action for the corresponding Chinese patent application No. 200680035248.5 dated Oct. 19, 2011, 22 pages.
First Office Action from the corresponding Chinese patent application No. 200980122611.0 dated Nov. 23, 2011.
Official Action for the corresponding Russian patent application No. 2011101386 transmitted Dec. 23, 2011.
Decision on Refusal to Grant from Russian patent application No. 2006145434 dated Feb. 18, 2011.
Office Action from Chinese Patent Application No. 200880110323.9, dated Jan. 29, 2012.
Written Opinion from Singapore Patent Application No. 201009093-4, dated Feb. 20, 2012.
Written Opinion and Search Report from the related Singapore patent application No. 201009226-0 dated Mar. 16, 2012.
Office Action from the related Russian patent application No. 2011101364 dated Feb. 8, 2012.
Communication Pursuant to Rules 161(1) and 162 EPC for application Serial No. EP 09767062.4, dated Jan. 27, 2011.
International Search Report from PCT Application No. PCT/US2011/047026, dated Jul. 11, 2011, 4 pgs.
Written Opinion from International Search Report from PCT Application No. PCT/US2011/047026, dated Jul. 11, 2011, 8 pgs.
Communication Pursuant to Rules 161(1) and 162 EPC for application Serial No. EP 10752246.8, dated May 3, 2012.
Written Opinion for the related Singapore patent application No. 2010092278 dated Feb. 16, 2012.
Written Opinion for the related Singapore patent application No. 2010092245 dated Jan. 6, 2012.
Japanese Office Action from JP 2011-514605, dated Jun. 19, 2012.
Communication Pursuant to Rules 161(1) and 162 EPC for application Serial No. EP 10765871.8, dated Apr. 27, 2012.
Office Action from Russian patent application No. 2011101386 dated Apr. 23, 2012, 4 pages.
Chinese Office Action from CN200980122835.1, dated Jul. 3, 2012.
Chinese Office Action from CN200980122761.1, dated Aug. 31, 2012.
First Office Action from Japanese patent application No. 2011514603, dated Jul. 10, 212.
First Office Action from Chinese patent application No. 200980122613.X, dated Aug. 15, 2012.
Second Office Action from Chinese patent application No. 200980122611.0 dated Aug. 20, 2012.
Official Action from Canadian patent application No. 2563337 dated Sep. 4, 2012.
Office Action from related European Application No. EP 09767062.4, dated Jul. 13, 2011, 5pgs.
Official Action from related Russian patent application No. 2009139488, dated Oct. 8, 2012. 3 pages.
Examination Report for the related Singapore application No. 201009226-0 dated Oct. 12, 2012. 11 pages.

* cited by examiner

WIRELESS POWER AND COMMUNICATION UNIT FOR PROCESS FIELD DEVICES

This application is a continuation-in-part application of and claims priority to U.S. patent application Ser. No. 29/204,502, filed Apr. 29, 2004.

BACKGROUND OF THE INVENTION

The present invention relates to industrial process control or monitoring systems. More specifically, the present invention relates to a system that adds wireless capability to field devices in such systems.

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices used in the measurement, control and monitoring of industrial processes.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by controlling the magnitude of the current through the loop. In addition to, or in the alternative, the process control loop can carry digital signals used for communication with field devices. Digital communication allows a much larger degree of communication than analog communication. Field devices that communicate digitally can respond to and communicate selectively with the control room and/or other field devices. Further, such devices can provide additional signaling such as diagnostics and/or alarms.

In some installations, wireless technologies have begun to be used to communicate with field devices. Wireless operation simplifies field device wiring and setup. Wireless installations are currently used in which the field device is manufactured to include an internal battery, potentially charged by a solar cell, or other technique to obtain power without any sort of wired connection. Problems exist in using an internal battery as the energy demands of wireless devices may vary greatly depending on numerous factors such as the device reporting rate, device elements, et cetera. A power and communication system that is external to the field device for wireless communication would be a significant improvement in this area.

SUMMARY

A wireless power and communication unit for field devices is configured to connect to a field device and provide operating power and wired, preferably digital, communication between the unit and the field device. RF circuitry configured to provide radio frequency communication. In one embodiment, power supply circuitry in the unit includes one or more solar power cells that convert solar energy into electricity to power both the unit and the field device. The wireless power and communication unit powers the field device and interacts with the field device in accordance with a standard industry communication protocol. The unit communicates wirelessly with an external device, such as a control room, based upon the interaction with the field device.

DETAILED DESCRIPTION

The present invention includes a wireless power and communication unit for allowing field devices that are designed for wired communication to operate wirelessly. While some devices are currently being developed which add wireless communication to wired devices, such developments do not function to untether legacy wired type field devices from their control loops since they still are wired to and receive power from their control loops.

Figure 1:
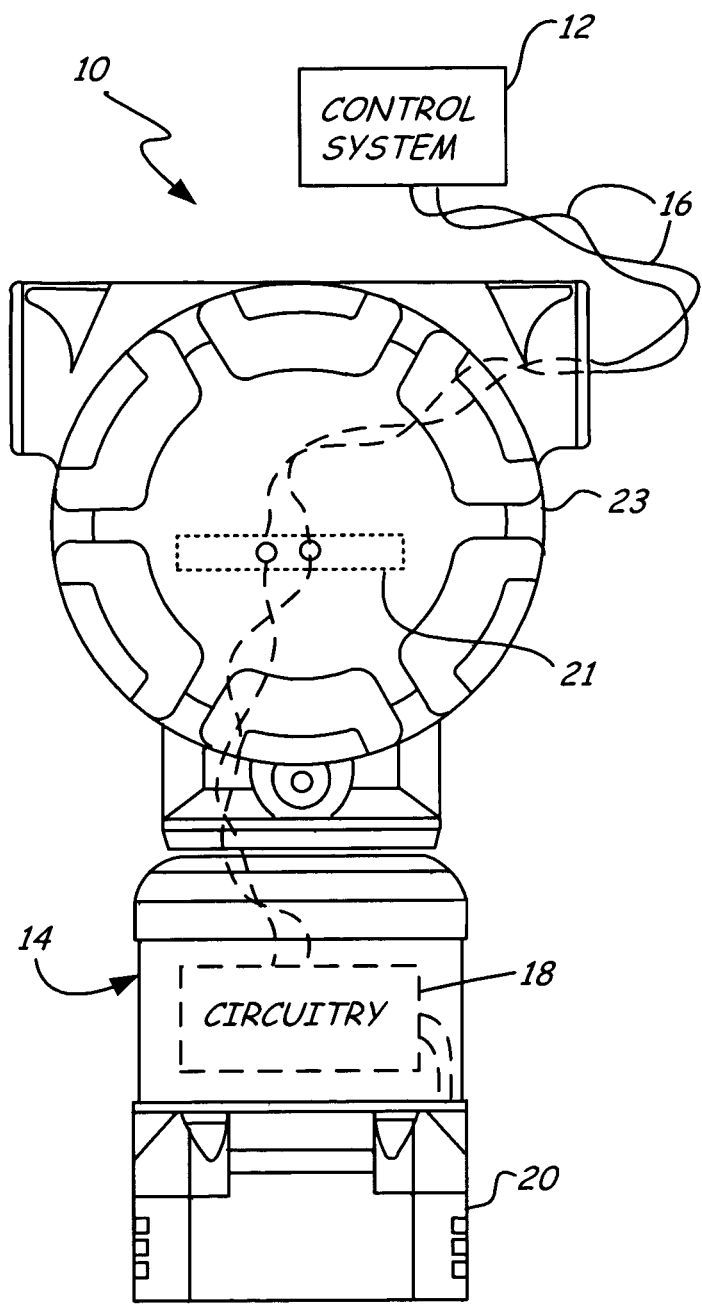
FIG. 1 is a diagrammatic view of an exemplary field device with which the wireless power and communication unit in accordance with the present invention is particularly useful.
Figure 2:
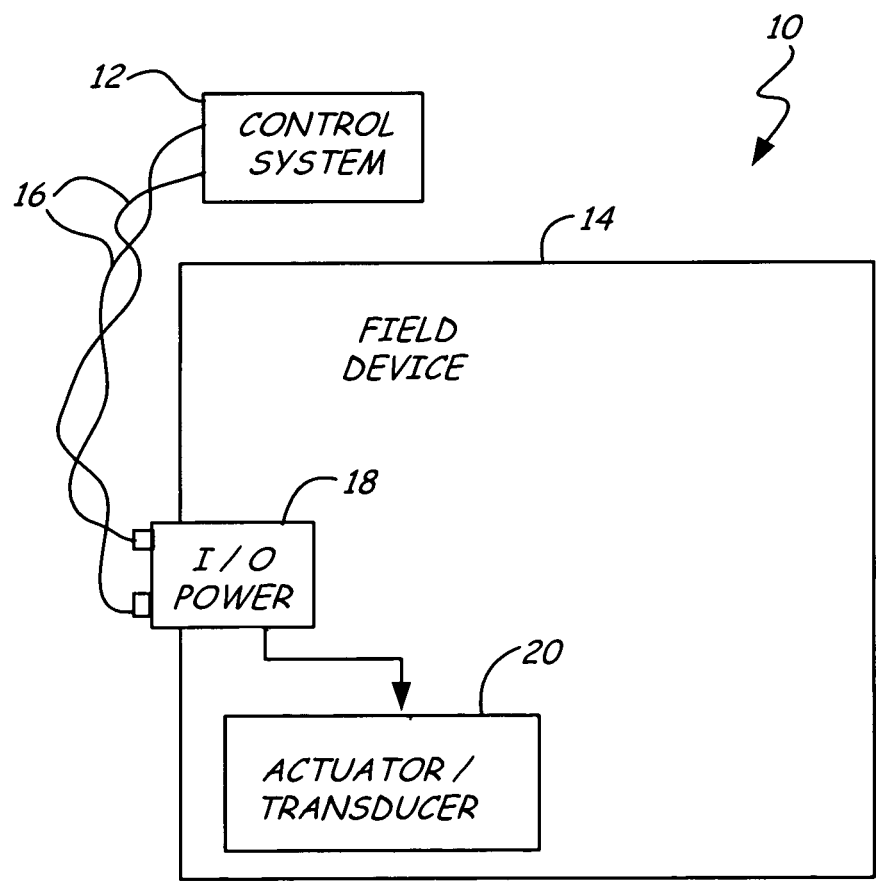
FIG. 2 is a block diagram of the field device shown in FIG. 1.

FIGS. 1 and 2 are diagrammatic and block diagram views of an exemplary field device with which a wireless power and communication unit in accordance with the present invention is particularly useful. Process control or monitoring system 10 includes a control room or control system 12 that couples to one or more field devices 14 over a two-wire process control loop 16. Examples of process control loop 16 include analog 4-20 mA communication, hybrid protocols which include both analog and digital communication such as the Highway Addressable Remote Transducer (HART®) standard, as well as all-digital protocols such as the FOUNDATION™ Fieldbus standard. Generally process control loop protocols can both power the field device and allow communication between the field device and other devices.

In this example, field device 14 includes circuitry 18 coupled to actuator/transducer 20 and to process control loop 16 via terminal board 21 in housing 23. Field device 14 is illustrated as a process variable (PV) generator in that it couples to a process and senses an aspect, such as temperature, pressure, pH, flow, et cetera of the process and provides and indication thereof. Other examples of field devices include valves, actuators, controllers, and displays.

Generally field devices are characterized by their ability to operate in the "field" which may expose them to environmental stresses, such as temperature, humidity and pressure. In addition to environmental stresses, field devices must often withstand exposure to corrosive, hazardous and/or even explosive atmospheres. Further, such devices must also operate in the presence of vibration and/or electromagnetic interference. Field devices of the sort illustrated in FIG. 1 represent a relatively large installed base of legacy devices, which are designed to operate in an entirely wired manner.

Figure 3:
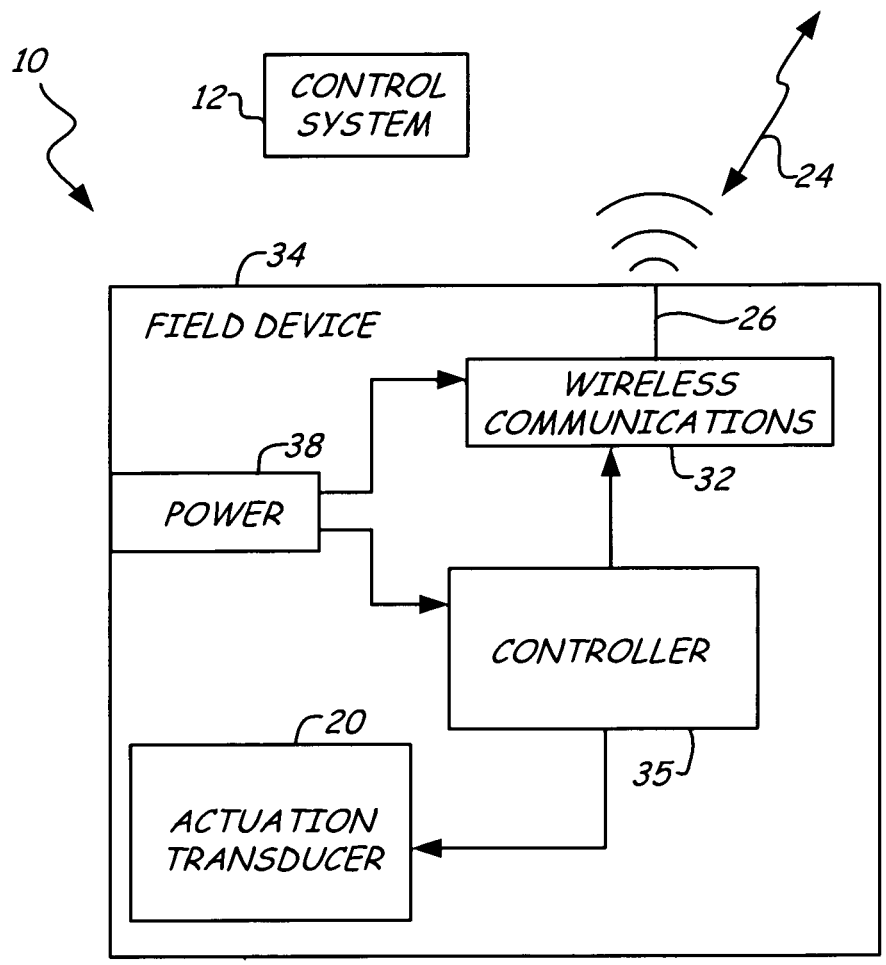
FIG. 3 is a block diagram of a field device including wireless communication circuitry for communicating with a remote device such as a display or hand held unit.

FIG. 3 is a block diagram of a wireless field device in accordance with the prior art. Field device 34 includes internal power supply module 38, controller 35, wireless communication module 32, and actuator/transducer 20. Power supply module 38 typically includes a battery that powers field device 34 for a period of time, until the battery needs to be replaced. Some field devices include a built-in solar cell. The power from supply 38 energizes controller 35 to interact with actuator/transducer 20 and wireless communications module 32. Wireless communications module 32, in turn, interacts with other devices as indicated by reference numeral 24 via antenna 26. One drawback with providing the wireless capability of device 34 internally, is that if a battery, solar cell, or wireless communications module should be damaged, the entire field device must be repaired or replaced. Another disadvantage of using an internal battery is that some users of wireless devices require much more energy than other users. For example, if the field device is activated once per minute, versus once per hour, the energy consumption is greatly increased. The energy usage also varies widely based on whether the device is configured with minimum system elements or is fully configured. Thus, the use of an internal power source is not scalable in the sense that varying energy demands from various users cannot be accommodated well.

Figure 4:
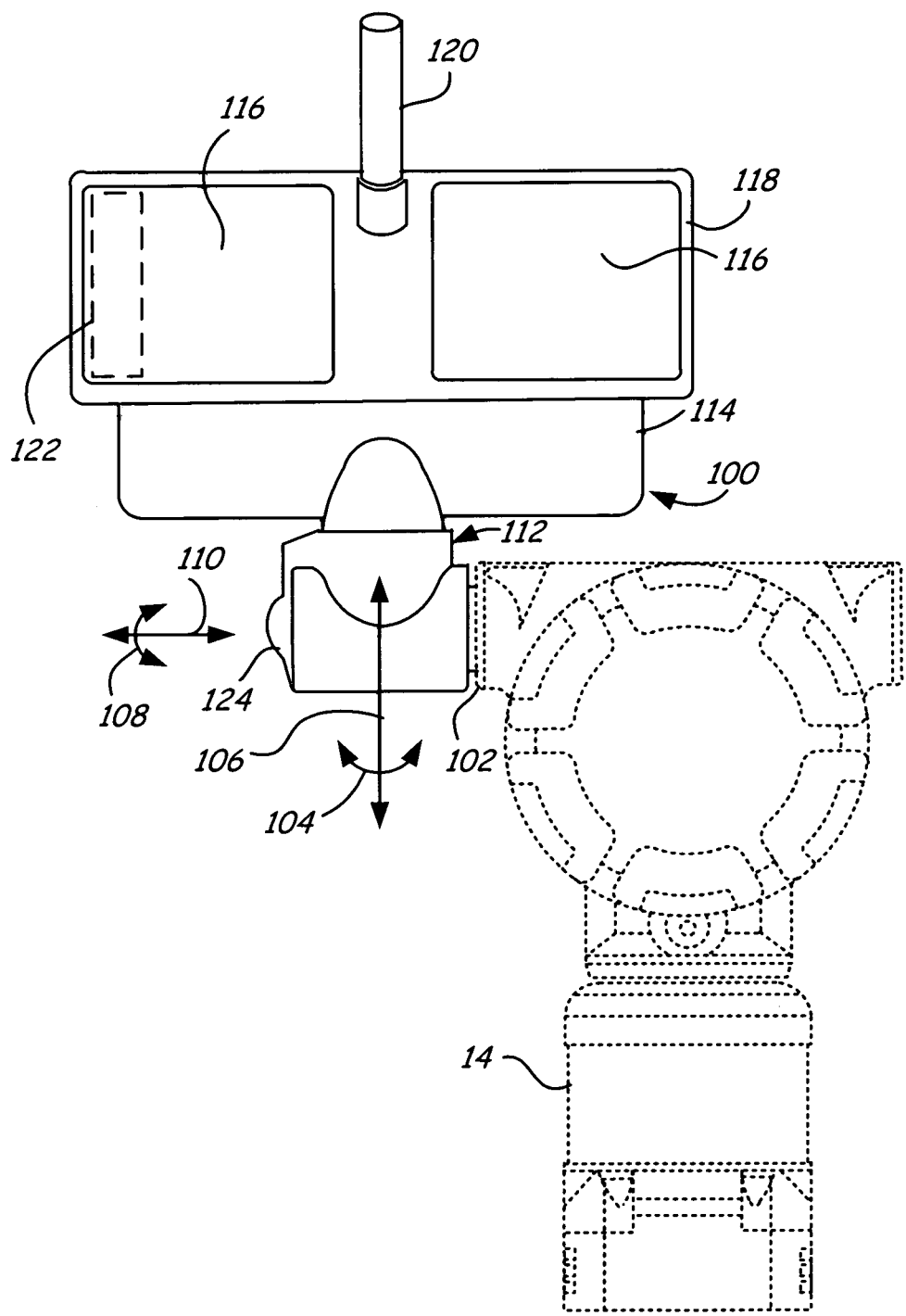
FIG. 4 is a front elevation view of a wireless power and communication unit in accordance with embodiments of the present invention mounted to a field device.

FIG. 4 is a front elevation view of a wireless power and communication unit 100 attached to a field device 14, shown in phantom. Unit 100 preferably attaches to device 14 via a standard field device conduit 102. Examples of suitable conduit connections include 1/2-14 NPT, M20x1.5, G1/2, and 3/8-18 NPT. Unit 100 may include a joint allowing rotation 104 about axis 106 and rotation 108 about axis 110. Further, attachment region 112 of unit 100 is preferably hollow in order to allow conductors therein to couple unit 100 to device 14. In embodiments where positional adjustment of the housing is not desired, attachment region 112 could simply be a piece of conduit.

Unit 100 includes housing 114 that is mounted upon attachment region 112. Housing 114 contains circuitry (described with respect to FIG. 8) to allow unit 100 to power and communicate with device 14 in accordance with a standard industry protocol such as 4-20 mA, HART®, FOUNDATION™ Fieldbus, Profibus-PA, Modbus, or CAN. Preferably, the protocol accommodates digital communication in order to enhance the level of interaction between unit 100 and device 14.

FIG. 4 also illustrates one or more photovoltaic cells 116 mounted proximate a top surface 118 of housing 114. In one embodiment, the photovoltaic cells(s) 116 form part of a sealed lid for the housing 114. In such embodiments, a clear cover preferably extends over cell(s) 116 to protect them from exposure. Cells 116 are preferably inclined at an angle of about 30 degrees and transform light falling thereon into electrical energy in order to power unit 100 and device 14. Since unit 100 is external to device 14, multiple variations of unit 100 can be provided with varying photovoltaic cell configurations and/or sizes depending upon the specific power requirements of the field device to which the unit will be attached. Unit 100 also preferably includes wireless communication circuitry (not shown in FIG. 4) which is coupled to antenna 120. Providing external antenna 120 facilitates wireless communication in comparison to internal antennas since many field-hardened enclosures are metal and would likely attenuate the wireless signal. However, embodiments with an internal antenna proximate a radio-transparent portion of housing 114, or cell(s) 116 can be practiced as well. External antenna embodiments, however, are particularly advantageous where unit 100 is field hardened in order to withstand environments similar to those for which field devices are designed.

In accordance with one aspect of the invention, unit 100 includes a local user interface. Accordingly unit 100 may include a display, such as an LCD display 122 that may be mounted proximate one of cells 116. In order to receive local user input, unit 100 can include one or more local inputs such as button 124. A local user interface is important because when the combined unit/field device system is operating totally wirelessly, it is more convenient for a technician to interact with the local user interface rather than wirelessly trying to access the device via a handheld computing device or the like. The local interface can be used to access the unit, the field device, or both. As defined herein "local user interface" means having either local user input(s) (such as a button), local user output(s) (such as an LCD), or a combination of the two. As illustrated in FIG. 4, the LCD can be co-located with cell(s) 116.

Figure 5:
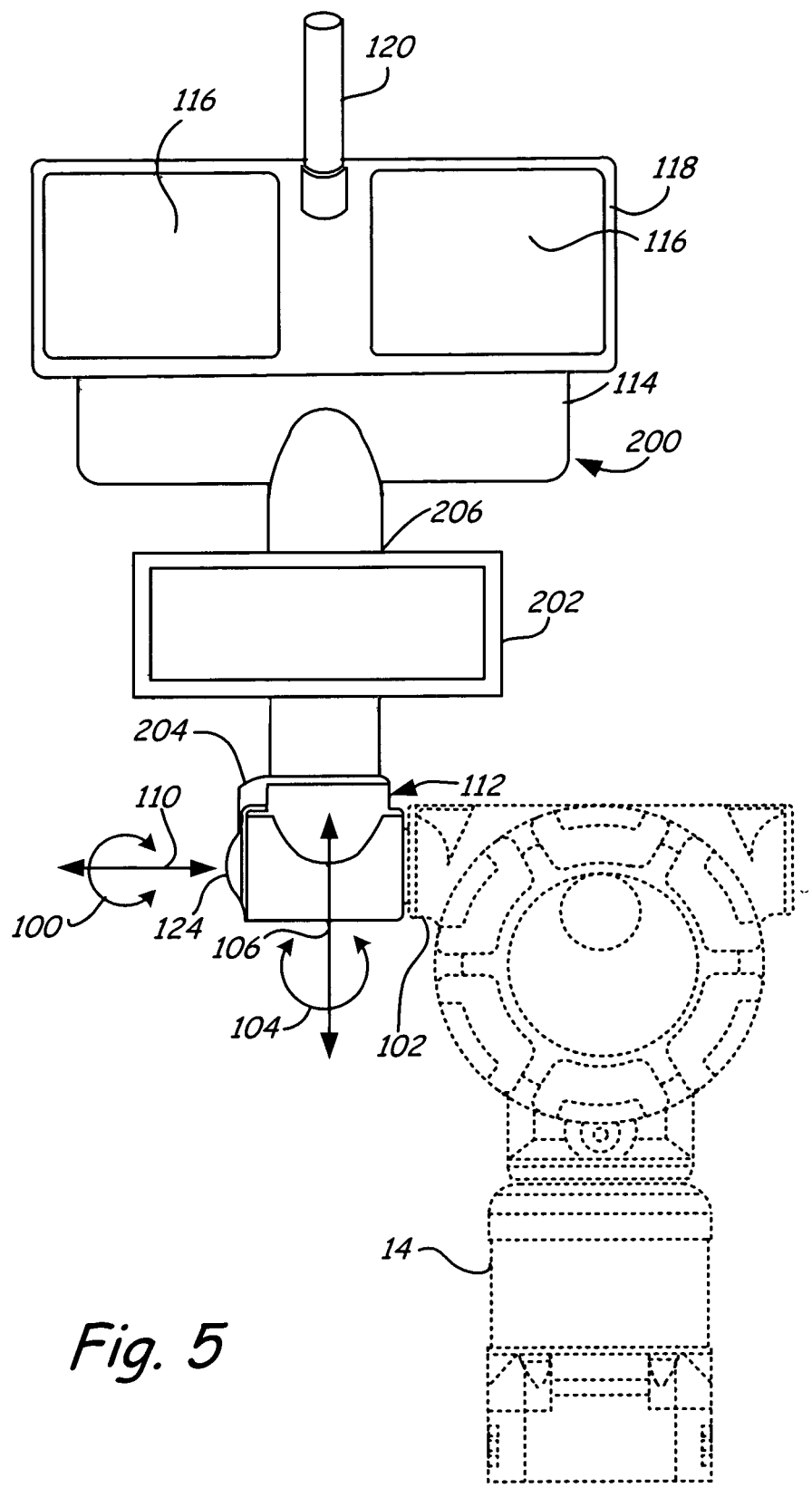
FIG. 5 is a front elevation view of a wireless power and communication unit in accordance with another embodiment of the present invention.

FIG. 5 is a front elevation view of a wireless power and communication unit in accordance with another embodiment of the present invention. Wireless power and communication unit 200 bears many similarities to wireless power and communication unit 100 and like components are numbered similarly. The primary difference between wireless power and communication unit 200 and wireless power and communication unit 100 is the configuration of the local user interface display. Specifically, unit 200 does not include a display proximate or co-located within the photovoltaic cell(s) 116. Instead, display 202 is integrated into attachment region 112. Preferably, display 202 is independently rotatable about axis 106 by approximately 270°.

Providing a user interface display proximate attachment region 112 increases the modularity of unit 200. Specifically, housings 114 and all components therein can be manufactured similarly to achieve economies of scale. In installations where a local user display is desirable, it can simply be added as a module between housing 114 and joint 204 of attachment region 112. Such modularity is also useful in embodiments where one unit 200 is used to operate and communicate with multiple field devices as will be described in greater detail with respect to FIGS. 6 and 7. Thus, as installation site needs dictate, the power system, which includes the solar cell and antenna can be remotely mounted by utilizing an adapter fitted with a cable gland that connects to the top 206 of LCD display 202. An adapter base is then used for mounting the housing 114 and bringing the interconnecting cable via a cable gland. This allows positioning housing 114 in an optimal performance location while keeping a local user interface proximate each field device.

Figure 6:
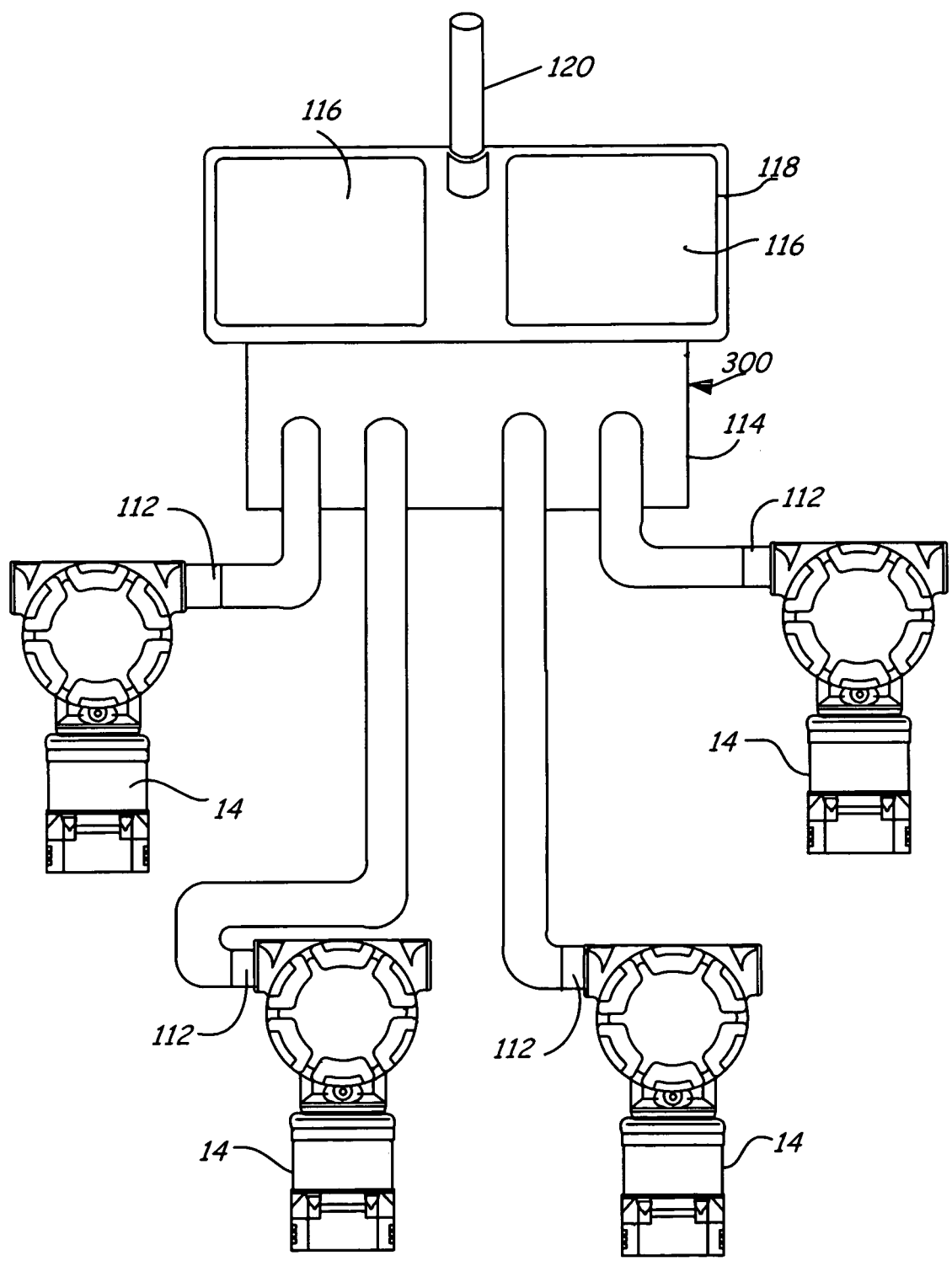
FIGS. 6 and 7 are diagrammatic views of a wireless power and communication unit operating with a plurality of field devices in accordance with embodiments of the present invention.

FIG. 6 is a diagrammatic view of a wireless power and communication unit 300 in accordance with an embodiment of the present invention. Wireless power and communication unit 300 is adapted for mounting remote from one or more field devices 14. Unit 300 includes suitable power generation and storage capabilities to power field devices 14 simultaneously, sequentially, or asynchronously. As illustrated in FIG. 6, each field device 14 is coupled individually to unit 300 by an attachment region 112 illustrated diagrammatically in FIG. 6. As stated above with respect to FIG. 5, attachment region 112 preferably includes a local user interface, such as button 124 and/or display 202. Since each field device 14 is individually coupled to unit 300, analog or digital communication with individual field devices 14 can be effected. While it is preferred that user interfaces are included in attachment regions 112 in the embodiment illustrated in FIG. 6, some embodiments may provide an additional, or alternative user interface embodied within unit 300.

Figure 7:
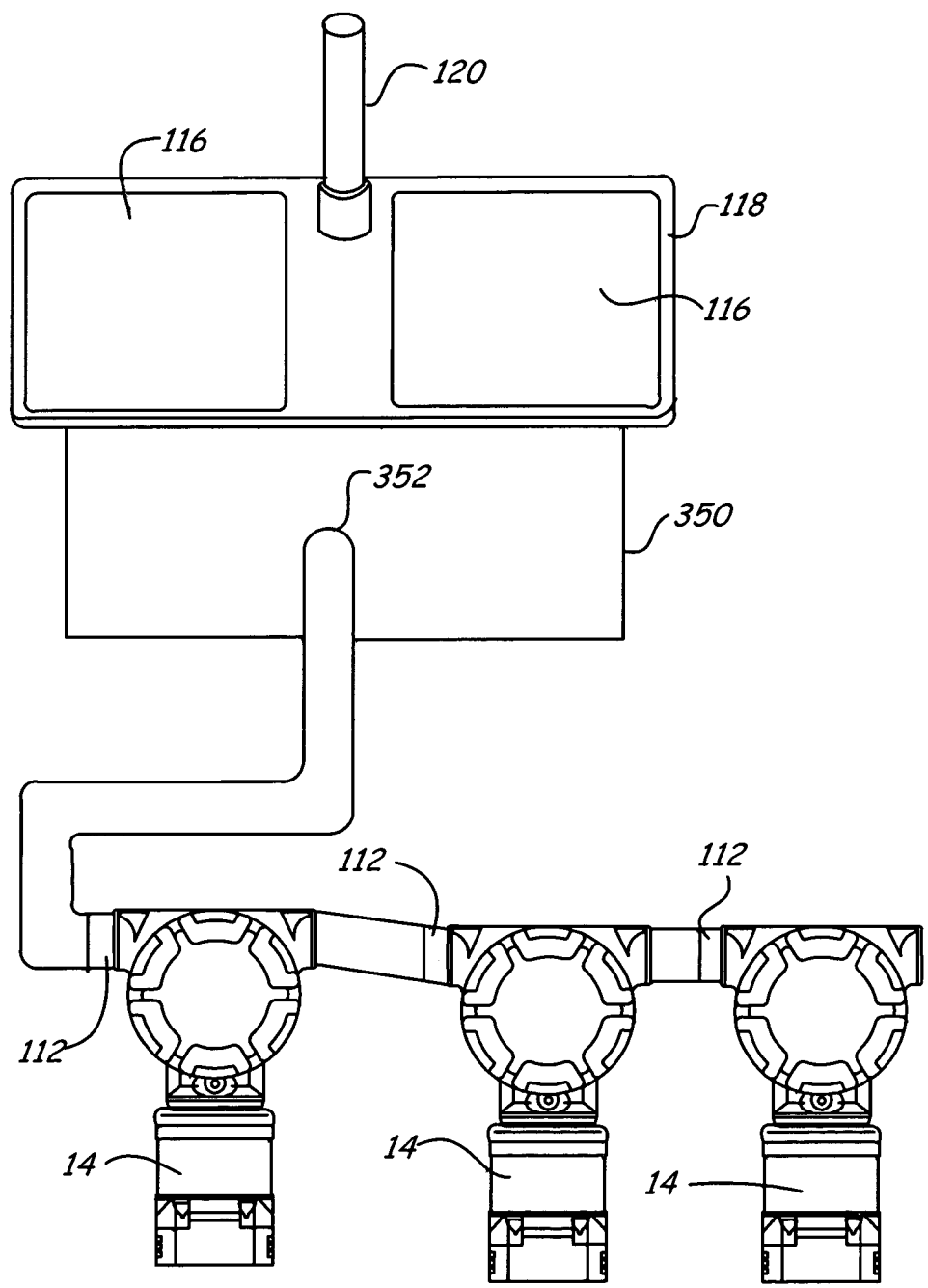

FIG. 7 is a diagrammatic view of unit 350 in accordance with another embodiment of the present invention. Unit 350 is illustrated with a single connection 352 to a plurality of field devices 14. Those skilled in the art will appreciate that the configuration illustrated in FIG. 7 has the ability to drastically reduce interconnection wiring and efforts for coupling field devices 14 to unit 350. In order to be able to communicate with individual field devices 14, unit 350 preferably employs digital communication utilizing either a hybrid-type protocol or an all-digital industry standard protocol. Further, such a protocol is used to power all of field devices 14, simultaneously, sequentially, or asynchronously as desired. FIG. 7 also illustrates each of field devices 14 coupling to the network utilizing an attachment region 112 illustrated diagrammatically. Thus, each of field devices 14 may still have a local user interface comprising a local user input and/or a local user output such as an LCD display.

Figure 8:
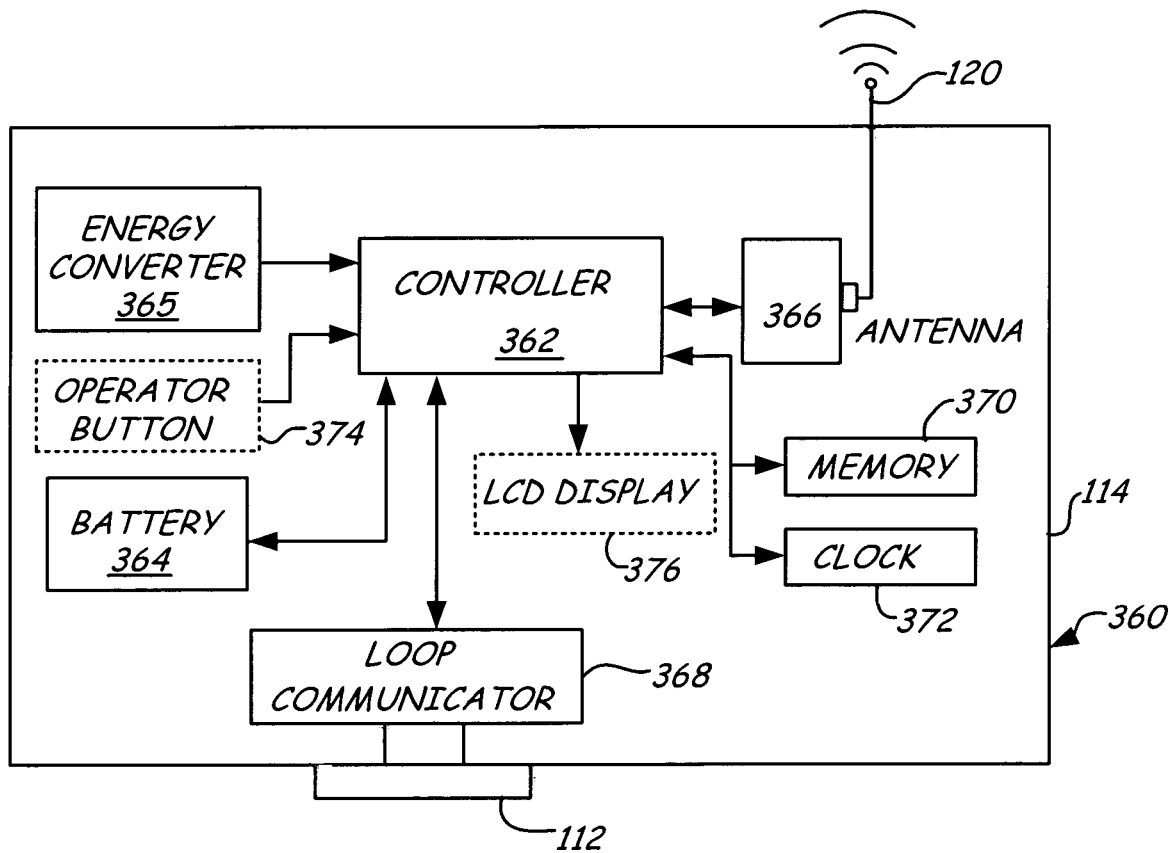
FIG. 8 is a block diagram of a wireless power and communication unit in accordance with embodiments of the present invention.

FIG. 8 is a block diagram of a wireless power and communication unit in accordance with embodiments of the present invention. Unit 360 includes controller 362, power storage device 364 (illustrated as a battery), energy converter 365, loop communicator 368, and wireless communication interface module 366.

Controller 362 preferably includes a low-power microprocessor and appropriate charging circuitry to convey suitable amounts of energy from cell(s) 116 and/or storage device 364 to power unit 360 and any field devices coupled to attachment region 112. Additionally, controller 362 also directs excess energy from cell(s) 116 to storage device 364. Controller 362 can also be coupled to optional temperature measurement circuitry such that controller 362 can reduce charging current to storage device 364 if device 364 begins to overheat. For example, the temperature measuring circuit may contain a suitable temperature-sensing element, such as a thermocouple coupled to storage device 364. An analog-to-digital converter could convert the signal from the thermocouple to a digital representation thereof, and provide the digital signal to controller 362.

Controller 362 can be configured, through hardware, software, or both to actively manage power for itself and attached field devices. In this regard, controller 362 can cause itself or any desired field devices to enter a low-power sleep mode. Sleep mode is any operating mode where power consumption is reduced. With respect to field devices, sleep mode could result from commanding the field device to set its operating current at its lowest allowable current rail. Events which may precipitate entering low-power mode could include: the expiration of an activity period, an input from one or more of the local user inputs, communication from one or more attached field devices, or wireless communication. Such events could also be used to cause unit 360 and/or any attached field devices to awaken from sleep mode. Additionally, controller 362 can selectively cause any attached field device to enter sleep mode based upon any logic or rules contained in programming instructions within controller 362 and/or wireless communication received via wireless communication module 366. Preferably, local inputs, such as button 124 are user configurable. Thus a single button could be used to awaken a field device for a user-selectable period of time, and if so configured, depressed again to cause the field device to return to sleep mode. In one embodiment, the configurable local input button uses a jumper or switch to preset the following functions:

Button Depress Time to Activate—select either 1, 1.5, 2 or 3 seconds. Field device ignores button presses having durations shorter than the preset.

Unit On Time—select either 10, 15, 30 seconds, or 5, 15, 30, 60 minutes.

If the button is pressed twice in close succession, the field device stays on for a preset period (for example 60 minutes) after which it returns to sleep mode.

If the button is pressed a second time after a preset interval (for example 5 seconds) the field device will return to sleep mode.

Controller 362 can also preferably cause portions of circuitry within unit 360 or attached field devices to enter sleep mode. For example, wireless communication module 366 may be a commercially available General Packet Radio Service (GPRS) cell phone module, that has both a normal operating mode and a sleep mode. A signal from controller 362 could cause module 366 to enter sleep mode when significant wireless communication is not warranted.

Energy converter 365 can be any device that is able to convert potential energy in the environment proximate unit 360 into electrical energy. In the preferred embodiments, converter 365 is simply one or more photo-voltaic cells 116. However, converter 365 can be any device, known or later developed, that can translate potential energy near unit 360 into electricity. Thus converter 365 can include a generator coupled to a movable member such that environmental motion, such as waves or wind generate electricity. Further, converter 365 can employ thermopile devices to generate electricity from disparate temperatures using the Peltier Effect. Further still, the process may provide a source of energy in the form of compressed gas or the like, that could be transformed into electricity. Finally, in embodiments where the power storage device has a relatively large capacity in comparison to the energy needs of the application, converter 365 may be omitted.

Wireless communication module 366 is coupled to controller 362 and interacts with external wireless devices via antenna 120 based upon commands and/or data from controller 362. Depending upon the application, wireless communication module 366 may be adapted to communicate in accordance with any suitable wireless communication protocol including, but not limited to: wireless networking technologies (such as IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Service (GPRS), Code Division Multiple Access (CDMA), spread spectrum technology, infrared communications techniques, SMS (Short Messaging Service/text messaging), or any other suitable wireless technology. Further, known data collision technology can be employed such that multiple units can coexist within wireless operating rage of one another. Such collision prevention can include using a number of different radio-frequency channels and/or spread spectrum techniques.

Wireless communication module 366 can also include transducers for a plurality of wireless communication methods. For example, primary wireless communication could be performed using relatively long distance communication methods, such as GSM or GPRS, while a secondary, or additional communication method could be provided for technicians, or operators near the unit, using for example, IEEE 802.11b or Bluetooth.

Some wireless communications modules may include circuitry that can interact with the Global Positioning System (GPS). GPS can be advantageously employed in unit 360 for mobile devices to allow finding the individual unit 360 in a remote location. However, location sensing based upon other techniques can be used as well.

Memory 370 is illustrated in FIG. 8 as being separate from controller 362, but may, in fact, be part of controller 362. Memory 370 can be any suitable type of memory including volatile memory (such as Random Access Memory), non-volatile memory (such as flash memory, EEPROM memory, etc.) and any combination thereof. Memory 370 may contain program instructions for controller 362 as well as any suitable administrative overhead data for unit 360. Memory 370 may contain a unique identifier for unit 360, such that unit 360 can distinguish wireless communications meant for it among other wireless communications. Examples of such an identifier could include, a Media Access Controller (MAC) address, Electronic Serial Number, global phone number, Internet Protocol (IP), or any other suitable identifier. Moreover, memory 370 may include information about attached field devices, such as their unique identifiers, configurations, and abilities. Finally, controller 362, using memory 370 can cause the output of unit 360 to be provided in any suitable form. For example, configuration and interaction with unit 360 and/or one or more associated field devices could be provided as HyperText Markup Language (HTML) web pages.

Clock 372 is illustrated as being coupled to controller 362, but may also be part of controller 362. Clock 372 allows controller 362 to provide enhanced operation. For example, clock 372 can be used to time the periods set forth above with respect to configurable button 125. Additionally, controller 362 can store information from one or more attached field devices, and correlate the information with time in order to recognize trends. Further still, controller 362 can supplement information received from one or more field devices with time information before transmitting it via wireless communication module 366. Further still, clock 372 can be used to automatically generate periodic sleep/awaken commands for unit 360 and/or field devices. Another form of periodic use for clock 372 is to cause controller 362 to issue, via module 366, a heartbeat type signal to periodically indicate an acceptable status to an external wireless device.

Loop communicator 368 is coupled to controller 362 and interfaces controller 362 to one or more field devices coupled to one or more attachment regions 112. Loop communicator 368 is known circuitry that generates appropriate signals in order to communicate in accordance with an industry protocol, such as those set forth above. In embodiments where unit 360 is coupled to a plurality of field devices that communicate in accordance with different protocols, it is conceivable that multiple loop communicators could be used to allow controller 362 to interact with the various field devices. The physical connection(s) made through attachment region 112 allows unit 360 to power and communicate with the field devices. In some embodiments, this can be done by providing power over the same conductors used for communication, such as a two-wire loop. However, it is also contemplated that embodiments of the invention can be practiced where power is provided to the field device on separate conductors than those used for communication. For ease of technician access, unit 360 may include two or more terminals proximate loop communicator 368 or attachment region 112 in order to facilitate the coupling of a handheld configuration device, such as the Model 375 Handheld device available from Rosemount, Inc. of Eden Prairie, Minn.

FIG. 8 also illustrates optional operator button block 374 and LCD display block 376 in phantom being coupled to controller 362. This illustration is intended to show that all local inputs, be they on individual field devices, wireless power and communication unit 360, or both are coupled to controller 362. Additionally, local user displays, on each field device, wireless power and communication unit 360, or both are also coupled to controller 362. This allows controller 362 to interact with each local display individually based upon inputs from the field device, the configurable button associated with the field device, one or more buttons or inputs disposed proximate unit 360, or from wireless communication.

Figure 9:
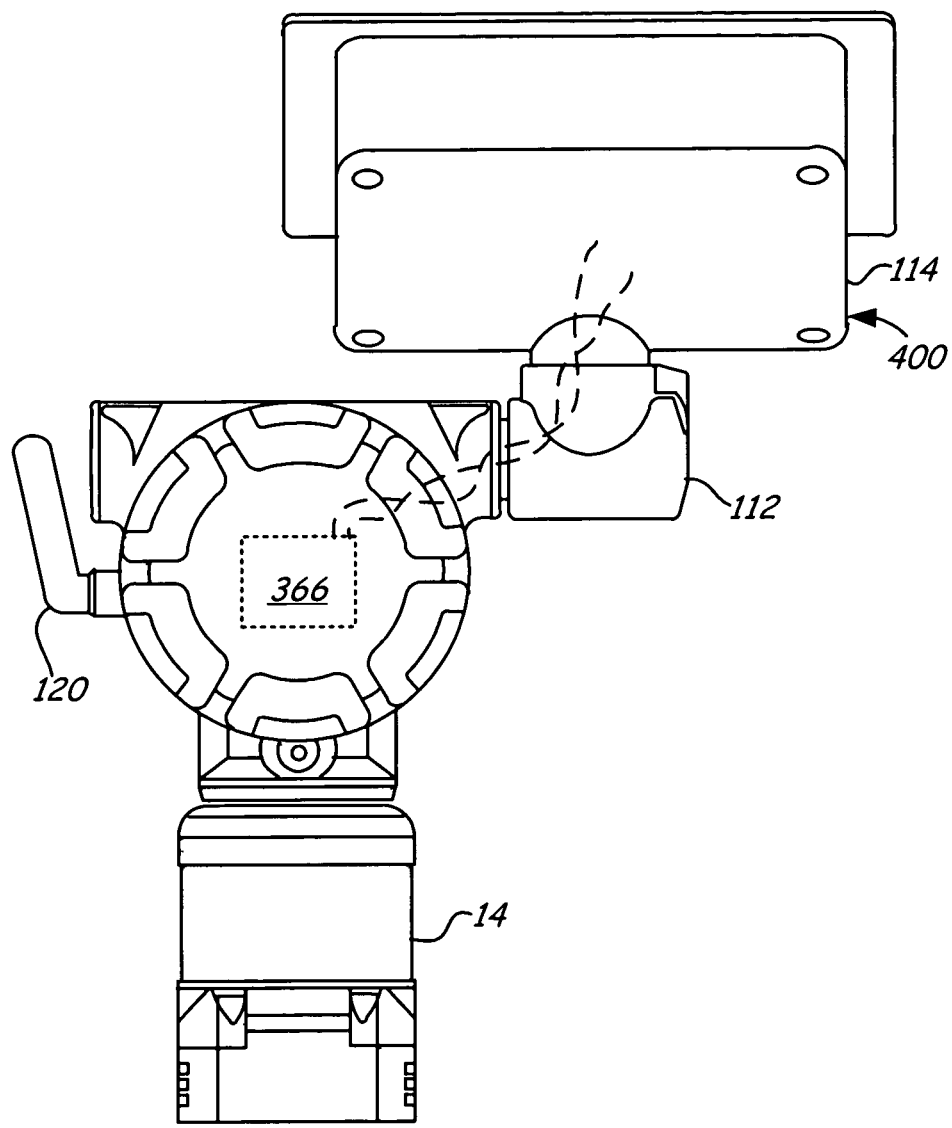
FIG. 9 is a rear elevation view of a wireless power and communication unit in accordance with an embodiment of the present invention.

FIG. 9 is a rear elevation view of a wireless power and communication unit in accordance with an embodiment of the present invention. Wireless unit 400 is coupled to field device 14 as in previous embodiments. However, wireless communication module 366 and/or antenna 120 can be located within field device 14 instead of within housing 114 of unit 400. Wireless communication module 366 and/or antenna 120 can be added to field device 14 as a feature board. Further, wireless communication module 366 could be an integral part of field device 14. Thus, in some embodiments, module 366 may be coupled to a controller within unit 400 via attachment region 112. In other embodiments, module 366 may be integral with the field device, and in such embodiments, unit 400 could simply provide operating power.

In operation, wireless power and communication units in accordance with embodiments of the present invention can add significant capabilities to process monitoring and control. While the wireless output of the wireless power and communication units may be simply indications of process variable, they may also contain much more information. For example, the wireless output could also include diagnostic and/or maintenance information. Further, the wireless power and communication unit could also provide alarms wirelessly if one or more of the field devices, or even the unit itself, generates a fault. The unit may direct the wireless alarm to the same entity as it normally sends wireless information to (such as a control room), or it may send to an alternate entity, such as a technician's pager. Further, in embodiments where the unit is coupled to more than one field device, the wireless output may be indicative of a combination of process variable, or a higher level output. Further still, in embodiments where the multiple field devices include PV generators, and one or more actuators that can effect a change in the process variable, the units themselves may actually provide local closed-loop process control autonomously without control room interaction, but still subject to wireless communication.

Although the present invention has been described with reference to preferred embodiments, workers skilled in the art will recognize that changes may be made in form and detail without departing from the spirit and scope of the invention.

What is claimed is:

1. A process communication system comprising:
   a process variable generator coupleable to the process, the process variable generator being operably coupled to a transducer and having communication circuitry for communication over a process control loop and receiving electrical power from the process control loop to power the process variable generator;
   a wireless power and communication unit for providing wireless operation to the process variable generator, the unit including:
   a housing;
   an attachment region coupling the housing to the process variable generator through a standard field device conduit;
   a power storage device disposed within the housing and configured to power the process variable generator;
   a loop communicator connected to the process variable generator via the attachment region and configured to interact with the process variable generator via the communication circuitry;
   a controller coupled to the power storage device and loop communicator, the controller being configured to interact with the process variable generator using the loop communicator and configured to actively manage power for the wireless power and communication unit and the process variable generator;
   a wireless communication module coupled to the controller and being configured for wireless communication based upon interaction with the process variable generator; and
   a local user interface;
   wherein the power management includes causing the process variable generator to enter a sleep mode; and
   wherein the power management includes causing at least a portion of the wireless power and communication unit to enter a sleep mode.

2. The system of claim 1, wherein the power storage device is a battery.

3. The system of claim 1, and further comprising a energy converter coupled to the controller and being adapted to convert a source of environmental potential energy into electricity.

4. The system of claim 3, wherein the energy converter includes at least one photo-voltaic cell.

5. The system of claim 4, wherein the at least one photo-voltaic cell seals a portion of the housing.

6. The system of claim 3, wherein the controller is adapted to recharge the power storage device with electricity from the energy converter.

7. The system of claim 3, and further comprising a temperature sensor operably coupled to the controller and disposed to sense a temperature of the energy storage device, and wherein the controller selectively charges the energy storage device based at least in part upon a signal from the temperature sensor.

8. The system of claim 7, wherein the temperature sensor is operably coupled to the controller through an analog-to-digital converter.

9. The system of claim 1, wherein the conduit has a size selected from the group consisting of a 3/8-18 NPT, a 1/2-14 NPT, a M20x1.5, and a G1/2.

10. The system of claim 1, wherein the attachment region includes at least one degree of freedom.

11. The system of claim 1, wherein the attachment region allows the housing to be rotatable about a first axis.

12. The system of claim 11, wherein the attachment region allows the housing to the rotatable about a second axis that is substantially orthogonal to the first axis.

13. The system claim 1, and further comprising a photo-voltaic cell disposed near a top surface of the housing at an angle of approximately 30 degrees with respect a bottom surface of the housing.

14. The system of claim 1, wherein the local user interface includes a button.

15. The system of claim 14, wherein the button is user configurable.

16. The system of claim 14, wherein the button is disposed proximate the attachment region.

17. The system of claim 1, wherein the user interface includes a display.

18. The system of claim 17, wherein the display is an LCD display.

19. The system of claim 17, wherein the display is located proximate a top surface of the housing.

20. The system of claim 19, wherein the display is located proximate a photo-voltaic cell.

21. The system of claim 17, wherein the display is mounted proximate the attachment region.

22. The system of claim 21, wherein the display is rotatable about the attachment region.

23. The system of claim 1, wherein the housing is field-hardened.

24. The system of claim 1, and further comprising an additional attachment region, the additional attachment region being configured to couple the wireless power and communication unit to an additional process variable generator and power and communicate with both process variable generators.

25. The system of claim 24, wherein the loop communicator is adapted to communicate digitally with both process variable generators.

26. The system of claim 1, wherein the controller includes a microprocessor.

27. The system of claim 1, wherein the loop communicator is configured to sense a current ranging between 4 and 20 milliamps.

28. The system of claim 1, wherein the loop communicator provides a two-wire connection to the process variable generator, which two wire connection provides power and communication with the process variable generator.

29. The system of claim 1, wherein the power management includes causing the process variable generator to enter a sleep mode.

30. The system claim 1, wherein the controller causes the portion of the wireless power and communication unit to enter a sleep mode based upon user input.

31. The system of claim 1, wherein the power storage device is selected based upon a scale of power required by the process variable generator.

* * * * *

UNITED STATES PATENT AND TRADEMARK OFFICE
CERTIFICATE OF CORRECTION

| | | |
|---|---|---|
| PATENT NO. | : 8,538,560 B2 | |
| APPLICATION NO. | : 10/850828 | |
| DATED | : September 17, 2013 | |
| INVENTOR(S) | : Gregory Brown et al. | |

It is certified that error appears in the above-identified patent and that said Letters Patent is hereby corrected as shown below:

On the Title Page, Item (63)

Related U.S. Application Data filed on April 29, 2005 should be --filed on April 29, 2004--.

Signed and Sealed this
Tenth Day of December, 2013

Margaret A. Focarino
*Commissioner for Patents of the United States Patent and Trademark Office*